United States Patent [19]

Hayashi et al.

[11] Patent Number: 4,714,318
[45] Date of Patent: Dec. 22, 1987

[54] CONNECTOR FOR OPTICAL FIBERS WITH A GAP

[75] Inventors: Kyozo Hayashi; Shigeru Noda, both of Osaka, Japan

[73] Assignee: Sumitomo Electric Industries, Ltd., Japan

[21] Appl. No.: 378,127

[22] Filed: May 14, 1982

[30] Foreign Application Priority Data

May 22, 1981 [JP] Japan ............... 56-74775[U]

[51] Int. Cl.$^4$ ............................................. G02B 6/36
[52] U.S. Cl. ............................................. 350/96.21
[58] Field of Search ................... 350/96.18, 96.21

[56] References Cited

U.S. PATENT DOCUMENTS

| 3,492,058 | 1/1970 | Waldman | 350/96.18 X |
|---|---|---|---|
| 4,107,242 | 8/1978 | Runge | 350/96.21 X |
| 4,116,532 | 9/1978 | Hubbard et al. | 350/96.21 |
| 4,119,362 | 10/1978 | Holzman | 350/96.18 |
| 4,181,402 | 1/1980 | Borsuk et al. | 350/96.21 |
| 4,268,112 | 5/1981 | Peterson | 350/96.21 X |
| 4,360,249 | 11/1982 | Slemon | 350/96.18 |
| 4,421,383 | 12/1983 | Carlsen | 350/96.18 X |

FOREIGN PATENT DOCUMENTS 1429843 3/1976 United Kingdom ............ 350/96.18

*Primary Examiner*—William L. Sikes
*Assistant Examiner*—Akm E. Ullah
*Attorney, Agent, or Firm*—Harness, Dickey & Pierce

[57] ABSTRACT

A connector for connecting optical fibers together with a gap between their ends is proposed. It includes a body with a pair of walls, a pair of sleeves, a pair of plugs, and a pair of rod lenses carried by the sleeves. The rod lenses assure transmission of light with minimum loss in spite of the presence of a gap between the opposed ends of the optical cables.

6 Claims, 3 Drawing Figures

CONNECTOR FOR OPTICAL FIBERS WITH A GAP

BACKGROUND AND SUMMARY OF THE INVENTION

The present invention relates to an optical connector for connecting a pair of optical fibers together with some gap between their ends.

When a screen or shelter is placed between opposed ends of a pair of optical fibers so as to intermittently interrupt the light transmitted thereby, the transmission of light through the two optical fibers is intermittent, depending on the frequency of interruption. In more detail, a pair of optical fibers are placed in alignment with each other with a gap left between their ends and a rotating disc with a hole or a slit is placed between the opposed ends of the optical fibers with the hole or slit aligned with the optical fibers. The light transmitted from one optical fiber passes through the hole or slit in the rotating disc to the other optical fiber. Thus, optical pulses whose number depends on the revolutions of the disc are produced. This can be utilized to measure the speed of rotation, etc.

In such an arrangement, the light from one of the optical fibers diverges from its end surface so that only part of the light is incident on the end surface of the other optical fiber, because of the difference between the refractive index of air and that of the optical fiber.

An object of the present invention is to provide an optical connector with a gap which obviates such a shortcoming and can transmit light with a minimum of loss.

In accordance with the present invention, an optical connector comprising a body having a pair of walls opposed with a gap therebetween and each having a hole for supporting an optical fiber therein, a pair of sleeves mounted in said holes, a pair of lenses mounted in said sleeves, and a pair of plugs mounted in said sleeves and formed with a hole for holding the end of an optical fiber therein so that its end abuts the end surface of the lens.

The transmission of light with a minimum of loss is possible by means of a pair of rod lenses in spite of the presence of a gap. The plugs each holding an optical fiber can be mounted and removed easily without the need of any particular attention.

Other features and advantages of the present invention will become apparent from the following description taken with reference to the accompanying drawings, in which:

DETAILED DESCRIPTION OF THE INVENTION

Figure 1:
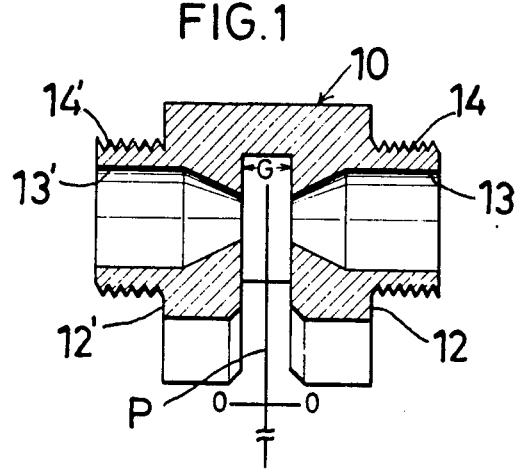
FIG. 1 is a sectional view of the body of an optical connector embodying the present invention.

Referring to FIG. 1, a connector body 10 for supporting two optic fibers is made of metal or plastic. It has an opposed pair of walls 12, 12' with a gap G left therebetween. These walls are each formed with a hole 13 (13') to hold the end of an optical fiber therein. The holes are aligned to each other. The connector body 10 is formed with a thread 14 (14') on the outer periphery at each end thereof to receive a knurled nut which will be described later.

Figure 2:
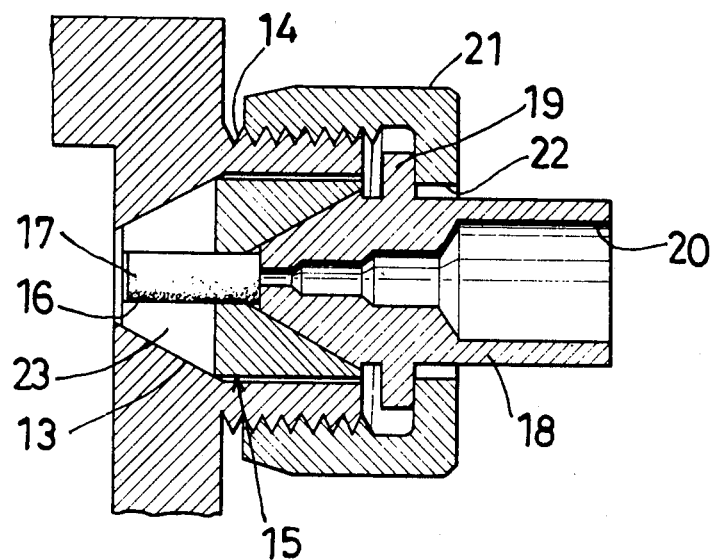
FIG. 2 is a partial sectional view of the embodiment.
Figure 3:
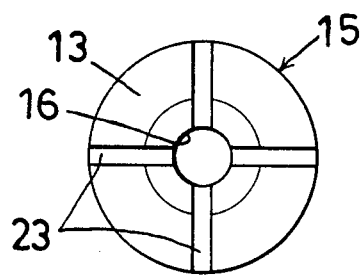
FIG. 3 is a plan view of the sleeve.

Referring to FIG. 2, a partial sectional view of a preferred embodiment of this invention is shown but with an optical fiber omitted. A conical metal sleeve 15 is mounted in the mounting hole 13. The sleeve is formed with a central hole 16 in which a rod lens 17 is fastened in position. In the preferred embodiment, the rod lens is fastened in such a position that its inner end slightly projects inwardly beyond the inner wall of the sleeve 15. The sleeve has a plurality of axial slits 23 to give it flexibility, as shown in FIG. 3, so that the rod lens will be fastened in position.

A plug 18 has a head of such a frustoconical shape as to be received in the conical inner surface of the sleeve 15. The entire plug 18 may be made of metal or its front portion may be made of hard rubber or elastomer and its rear portion made of metal. It is formed with a flange 19 slightly behind its head. It is also formed with a stepped hole 20 so as to receive the end of an optical fiber. The hole has different diameters changing steppedly toward its front end to receive the end of the fiber which consists of a conductor, a primary covering, a reinforcement layer, and a secondary covering. The hole 16 of the sleeve 15 is adapted to be aligned with the hole 20 of the plug 18.

When assembling the optical connector of this invention, the sleeve 15 in which the rod lens 17 is secured is firstly mounted in the hole 13 of the connector body 10 and then the plug 18 carrying an optical cable is mounted in the sleeve 15. Finally a knurled nut 21 with a hole 22 is screwed on the connector body with the thread 14 to urge the flange 19 on the plug 18 forwardly, thereby clamping the plug 18 against the sleeve 15.

The optical fiber used generally has a conductor of quartz glass or plastic, a primary covering thereon, a reinforcing layer of such a material as aromatic polyamide (aramide) fiber and a secondary covering which is the outermost layer. The reinforcing layer is provided to reinforce the conductor which is extremely thin and has a small mechanical strength. The coverings at end of the optical fiber are peeled so as to be received in the stepped hole 20 of the plug 18. The primary covering is peeled so that the conductor will be long enough to protrude slightly beyond the end of the plug 18.

After the optical fiber with its end treated has been mounted in the plug 18, the rear end of the plug is caulked to fasten the optical fiber to the plug so that the conductor will not come off under a pulling force even though the reinforcing layer, etc. are present between the conductor and the inner wall of the plug.

After caulking, the portion of the fiber projecting from the plug tip is cut off so as to be flush with the end surface of the plug. This assures that when the plug 18 is completely mounted in the sleeve 15, the end of the conductor abuts the end surface of the rod lens 17. Since the rod lens used has a diameter of about 1 mm whereas the diameter of the conductor is as small as 50 $\mu$m at most, the conductor is kept substantially aligned with the rod lens.

Although the connection of an optical fiber to one wall 12 has been described above, the same is true for the connection to the other wall 12'. The optical connector is so constructed that a pair of optical fibers are connected thereto so as to be aligned with each other.

In operation, a pair of the optical fibers are connected in the abovementioned manner with the gap G therebetween to the optical connector of the present invention. When a source of light is connected to one of the optical fibers, the flux of light passes from the one optical fiber through the two rod lenses to the other optical fiber by which it is transmitted to a desired place. By using rod lenses having a refractive index which is the larger at a position the closer to its axis, the light can be transmitted with a minimum of transmission loss in spite of the presence of the gap.

If in FIG. 1 a propeller P rotates about the axis of rotation O—O in the gap G, for example, the light passing through the connector is intermitted by the propeller. The intermission of light is used to measure the number of revolutions of the propeller in a given period of time, for example.

Although a preferred embodiment has been shown and described above, it is to be understood that various modifications and changes are possible without departing from the scope of the present invention.

What is claimed is:

1. An optical connector for connecting a pair of optical fibers together with a gap between their opposed ends, comprising: a body for supporting a pair of optical fibers therein, a pair of sleeves, means on said body for mounting each of said sleeves in a centered relation to the other of said sleeves, a pair of lenses each fixed in a respective of said sleeves, and a pair of plugs and means for mounting each of said plugs in centralized location relative to a respective of said sleeves, each of said plugs being formed with a hole for holding the end of an optical fiber in forced engagement with the lens of the respective sleeve, said sleeve having a central opening and said plug having a frusto-conical head received in and centralized by the conical opening of said sleeve.

2. An optical connector for connecting a pair of optical fibers together with a gap between their opposed ends, comprising: a body for supporting a pair of optical fibers therein, a pair of sleeves, means on said body for mounting each of said sleeves in a centered relation to the other of said sleeves, a pair of lenses each fixed in a respective of said sleeves, and a pair of plugs and means for mounting each of said plugs in centralized location relative to a respective of said sleeves, each of said plugs being formed with a hole for holding the end of an optical fiber in forced engagement with the lens of the respective sleeve, a pair of nuts adapted to be screwed on the ends of said body and to engage an annular flange formed on said plug.

3. An optical connector for connecting a pair of optical fibers together with a gap between their opposed ends, comprising: a body for supporting a pair of optical fibers therein, a pair of sleeves, means on said body for mounting each of said sleeves in a centered relation to the other of said sleeves, a pair of lenses each fixed in a respective of said sleeves, and a pair of plugs and means for mounting each of said plugs in centralized location relative to a respective of said sleeves, each of said plugs being formed with a hole for holding the end of an optical fiber in forced engagement with the lens of the respective sleeve, said sleeves having a conical forward end formed with a plurality of slits axially extending toward its tip to give the sleeve flexibility, whereby fastening said lens therein snugly.

4. An optical connector for an optical fiber comprising a body having a wall formed with a hole for supporting an optical fiber therein, a sleeve, means for mounting and centering said sleeve in said hole, a lens mounted in said sleeve, and a plug mounted in said sleeve and formed with a hole for holding the end of an optical fiber therein in engagement with said lens, said sleeve having a conical opening terminating at said lens and said plug has a frusto-conical head so as to fit in said sleeve conical opening.

5. An optical connector for an optical fiber comprising a body having a wall formed with a hole for supporting an optical fiber therein, a sleeve, means for mounting and centering said sleeve in said hole, a lens mounted in said sleeve, and a plug mounted in said sleeve and formed with a hole for holding the end of an optical fiber therein in engagement with said lens, a nut adapted to be screwed on the end of said body and to engage an annular flange formed on said plug.

6. An optical connector for an optical fiber comprising a body having a wall formed with a hole for supporting an optical fiber therein, a sleeve, means for mounting and centering said sleeve in said hole, a lens mounted in said sleeve, and a plug mounted in said sleeve and formed with a hole for holding the end of an optical fiber therein in engagement with said lens, said sleeve being formed with a plurality of slits axially extending toward its tip to give said sleeve flexibility, whereby fastening said lens therein snugly.

* * * * *

UNITED STATES PATENT AND TRADEMARK OFFICE
CERTIFICATE OF CORRECTION

PATENT NO. : 4,714,318

DATED : December 22, 1987

INVENTOR(S) : Kyozo Hayashi et al

It is certified that error appears in the above-identified patent and that said Letters Patent is hereby corrected as shown below:

Column 3, line 34, Claim 1, "central" should be --conical--.

Signed and Sealed this

Twenty-fourth Day of May, 1988

Attest:

DONALD J. QUIGG

Attesting Officer

Commissioner of Patents and Trademarks